US009827520B2

(12) United States Patent
Nichols et al.

(10) Patent No.: US 9,827,520 B2
(45) Date of Patent: Nov. 28, 2017

(54) INTEGRATED FILTER SUPPORT (71) Applicant: Johnson Controls Technology Company, Holland, MI (US)

(72) Inventors: Jeffrey N. Nichols, Wichita, KS (US); Bart A. Balthazor, Valley Center, KS (US); Wayne E. Romero, Oxford, KS (US); Tony M. Clark, Wichita, KS (US); Thomas J. Martin, Goddard, KS (US); Carla M. Barrier, El Dorado, KS (US); Emily E. Zimmerman, Wichita, KS (US); Robert A. Parks, Valley Center, KS (US); George T. Mayo, IV, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 77 days.

(21) Appl. No.: 14/849,331

(22) Filed: Sep. 9, 2015

(65) Prior Publication Data

US 2016/0067643 A1 Mar. 10, 2016

Related U.S. Application Data

(60) Provisional application No. 62/048,750, filed on Sep. 10, 2014.

(51) Int. Cl.
*B01D 46/00* (2006.01)
*B01D 46/10* (2006.01)

(52) U.S. Cl.
CPC ......... *B01D 46/0005* (2013.01); *B01D 46/10* (2013.01)

(58) Field of Classification Search
CPC .............. B01D 46/002; B01D 46/0002; B01D 46/0005; B01D 46/00; B01D 46/0016; B01D 2279/50; F16L 23/16; Y10S 55/05; Y10S 55/31
USPC .................. 55/490, 495, 385.2; 454/187
See application file for complete search history.

(56) References Cited

U.S. PATENT DOCUMENTS

| 4,304,427 A * | 12/1981 | McCabe | F16L 23/14 160/381 |
| 2004/0148915 A1* | 8/2004 | Lipner | B01D 46/0002 55/495 |
| 2007/0084167 A1* | 4/2007 | Ticknor | B01D 46/002 55/484 |

(Continued)

*Primary Examiner* — Duane Smith
*Assistant Examiner* — Minh-Chau Pham
(74) *Attorney, Agent, or Firm* — Fletcher Yoder, P.C.

(57) ABSTRACT

The present disclosure relates to an air handling system including a casing structure formed from a cohesive sheet of material. The air handling system also includes a first side wall of the casing structure including a first section of the cohesive sheet of material. The air handling system also includes a first support portion extending inwardly from the first side wall. The first support portion includes a folded portion of the first side wall. The air handling system also includes a second side wall disposed substantially opposite the first side wall. The second side wall includes a second section of the cohesive sheet of material. The air handling system further includes a second support portion extending inwardly from the second side wall. The second support portion includes a folded portion of the second side wall. The first and second support portions are configured to support a filter.

20 Claims, 6 Drawing Sheets (56) References Cited

U.S. PATENT DOCUMENTS

2013/0291502 A1* 11/2013 Gorman ............ B01D 46/0005
55/490
2016/0123655 A1* 5/2016 Chow ................ F25D 23/04
312/404

* cited by examiner

INTEGRATED FILTER SUPPORT

CROSS-REFERENCE TO RELATED APPLICATION

This application claims priority from and the benefit of U.S. Provisional Application Ser. No. 62/048,750, filed Sep. 10, 2014, entitled "INTEGRATED FILTER SUPPORT," which is hereby incorporated by reference in its entirety for all purposes.

BACKGROUND

The present disclosure relates generally to air handling units and, more specifically, to integrated filter supports of air handling units.

Air handling units are widely used in Heating, Ventilation and Air Conditioning (HVAC) systems for the purposes of changing the thermal conditions of air and removing undesired particles and odors from the air. An air handling unit is typically designed to have a casing, within which various components are installed. For example, an air handling unit may typically include a heat exchanger and a fan for circulating the air to be conditioned in heat exchange relation with the heat exchanger.

An air handling unit may also typically include a filter, which is typically removable and replaceable, for screening undesired particles from the air flowing through the air handling unit. Accordingly, a filter support (e.g., rail, rack, bracket, drawer) may be attached to (e.g., screwed to or otherwise fastened to) the interior walls of the air handling unit casing for locating and supporting the filter.

SUMMARY

Embodiments of the present disclosure relate to an air handling system. The air handling system includes a casing structure formed from a cohesive sheet of material. The air handling system also includes a first side wall of the casing structure including a first section of the cohesive sheet of material. The air handling system also includes a first support portion extending inwardly from the first side wall. The first support portion includes a folded portion of the first side wall. The air handling system also includes a second side wall disposed substantially opposite the first side wall. The second side wall includes a second section of the cohesive sheet of material. The air handling system further includes a second support portion extending inwardly from the second side wall. The second support portion includes a folded portion of the second side wall. The first and second support portions are configured to support a filter.

Embodiments of the present disclosure also relate to a method of manufacturing a casing for an air handling system. The method includes bending a unified sheet to form a first side wall, a back wall, and a second side wall of the casing such that the back wall extends between and is substantially perpendicular with the first and second side walls. The method also includes folding a portion of the first side wall to form a first support portion extending inwardly from the first side wall. The method further includes folding a portion of the second side wall to form a second support portion extending inwardly from the second side wall. The first and second support portions are configured to support a filter.

Embodiments of the present disclosure also relate to an air handling system. The air handling system includes a casing formed from a solid sheet of material. The air handling system also includes at least three walls of the casing formed from portions of the solid sheet of material separated by creases that are formed substantially in parallel. The air handling system further includes edges of the walls that are folded to form projections extending inward relative to the casing. The projections are configured to cooperate to retain a filter within the casing.

DETAILED DESCRIPTION

The present disclosure is directed to an integrated filter support that is a part of an air handing unit casing. In accordance with an embodiment of the present disclosure, the air handing unit casing is formed from a single cohesive sheet of material (e.g., metal, polymer, or carbon fiber), a part of which may be folded to form walls and a filter support. By making the filter support from integral features of the air handling unit casing, the material and labor for fabricating a separate filter support may be reduced or eliminated, and the labor for installing the separate filter support into the air handling unit casing may also be reduced or eliminated. Although the integrated filter support is described herein in the context of an air handing unit, it should be noted that the integrated filter support may have like applicability in any cabinet-type device where it is desired to hold a filter element.

Figure 1:
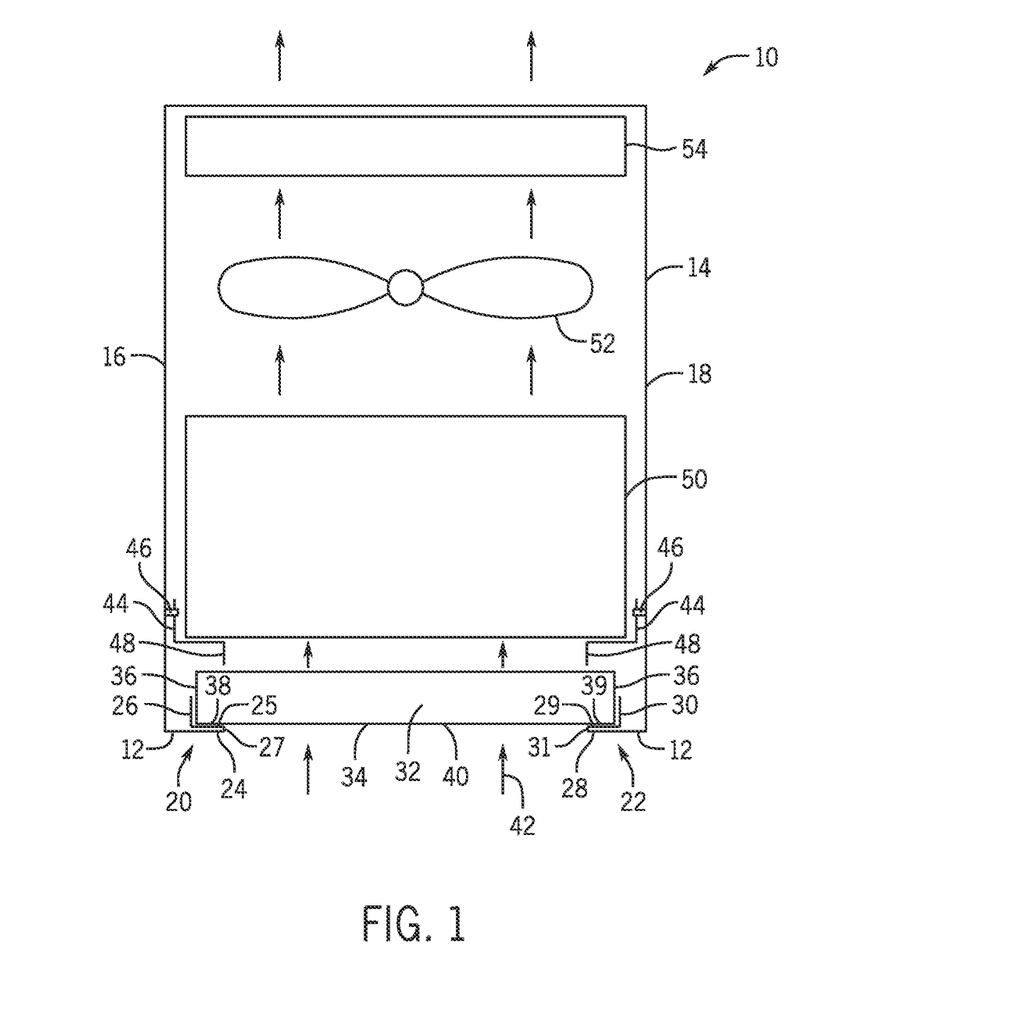
FIG. 1 is a schematic block diagram of an air handling unit including a filter support integral with wall portions in accordance with an embodiment of the present disclosure.

With the foregoing in mind and turning to the figures, FIG. 1 illustrates schematically an air handling unit 10 including a filter support 12 in accordance with an embodiment of the present disclosure. The air handling unit 10, as illustrated, is positioned in a vertical orientation or manner (e.g., air may flow vertically through the air handling unit 10) and will be described accordingly. However, it should be noted that the air handling unit 10 may be positioned in a horizontal manner or any other suitable manner, and the filter support 12 in accordance with the present disclosure may be likewise applied to the air handling unit 10 positioned in other orientations or manners.

The air handling unit 10 includes a casing (or housing, wrapper) 14 forming two side walls (e.g., a first side wall 16 and a second side wall 18) and a rear wall, as discussed in greater detail below. A cabinet cover (initially separate from the casing 14) may be placed over the front of the air handling unit 10 as a door or front wall to complete an enclosure of the air handling unit 10. In some embodiments, the casing 14 may also form a front wall without using a separate cover or door. The enclosure may physically separate the conditioned and circulated air inside the air handling unit 10 from the air in the surrounding environment and provide a protective cover for various components of the air handling unit 10 disposed within the enclosure. Air 42 may flow through the air handling unit 10 generally from the bottom to the top of the air handling unit 10.

The air handling unit 10 includes the filter support 12 located at the bottom of the air handling unit 10. The filter support 12, in accordance with the present disclosure, is formed from the casing 14, thereby making it an integrated part of the casing 14. For example, the filter support 12 includes a first support portion 20 and a second support portion 22 formed by folding or bending the edges of the first side wall 16 and the second side wall 18, respectively, inwardly at the bottom of the air handling unit 10. As will be discussed in greater detail below, the first support portion 20 may include multiple folds of the edge of the first side wall 16. A first fold forms a first base portion 24 of the first support portion 20. The first base portion 24 extends inwardly from the first side wall 16. A second fold forms a first upper ledge 25 of the first support portion 20. The first upper ledge 25 extends outwardly toward the first sidewall 16 from an innermost edge 27 of the first base portion 24. A third fold forms a first flange 26 of the first support portion 20. The first flange 26 extends upwardly from the first upper ledge 26. Likewise, the second support portion 22 of the filter support 12 may include a second base portion 28 (with an innermost edge 31), a second upper ledge 29, and a second flange 30.

The first support portion 20 and the second support portion 22 of the filter support 12 are configured to support or hold a filter 32. For example, the first base portion 24 and the second base portion 28 may support or hold the bottom side 34 (e.g., portions of the bottom side 34 proximate two sides 36) of the filter 32. As illustrated, the first support portion 20 and the second support portion 22 may cover or abut portions 38, 39, respectively, of the bottom side 34 of the filter 32 by virtue of supporting or holding the filter 32, while leaving another portion 40 of the bottom side 34 of the filter 32 uncovered. With this uncovered portion 40, the air 42 may flow through the filter 32 into the air handling unit 10. The filter 32 is configured to remove particles from the air 42 as the air 42 flows through the filter 32 and may be any type of filter suitable for removal of particles from the air 42. The filter 32 is also disposed horizontally between the first flange 26 and the second flange 30 such that the horizontal movement of the filter 32 is limited. In some embodiments, the filter support 12 may additionally include a third support portion, similar to the first support portion 20 and the second support portion 22, that is formed by folding or bending the edge of the rear wall of the casing 14. This additional support portion, together with the first support portion 20 and the second support portion 22, may be configured to support or hold the filter 32.

One or more side angles 44 may be attached to interior walls (e.g., interior side of the casing 14) of the air handling unit 10, for example, with one or more fasteners 46. The one or more side angles 44 are positioned above the filter support 12 and may each include an elongated tooth portion 48 positioned generally vertically. The filter 32 is disposed in between the one or more tooth portions 48 of side angles 44 and the filter support 12 such that the vertical movement of the filter 32 is limited. In some embodiments, the side angles 44 (and the tooth portions 48) may also be integral with and formed from the casing 14. In such embodiments, the side angles 44 are formed in a similar manner to the support portions 20, 22, for example, by folding some portions of the support portions 20, 22 to extend further upwardly and then inwardly.

The air handling unit 10 also includes a heat exchanger 50 disposed above the filter 32, for example, on the one or more side angles 44. The heat exchanger 50 may include one or more coils, within which a refrigerant may flow through to exchange heat with the air 42 as the air 42 flows through the heat exchanger 50. To facilitate the flow of the air 42 through the air handling unit 10, the air handling unit 10 may include one or more fans 52. The one or more fans 52 may draw the air 42 through the heat exchanger 50 and discharge the air 42 upwardly through the top of the air handling unit 10. An electric resistance heater 54 may also be included in (e.g., at the top of) the air handling unit 10 for adding heat energy to the air 42.

Figure 2:
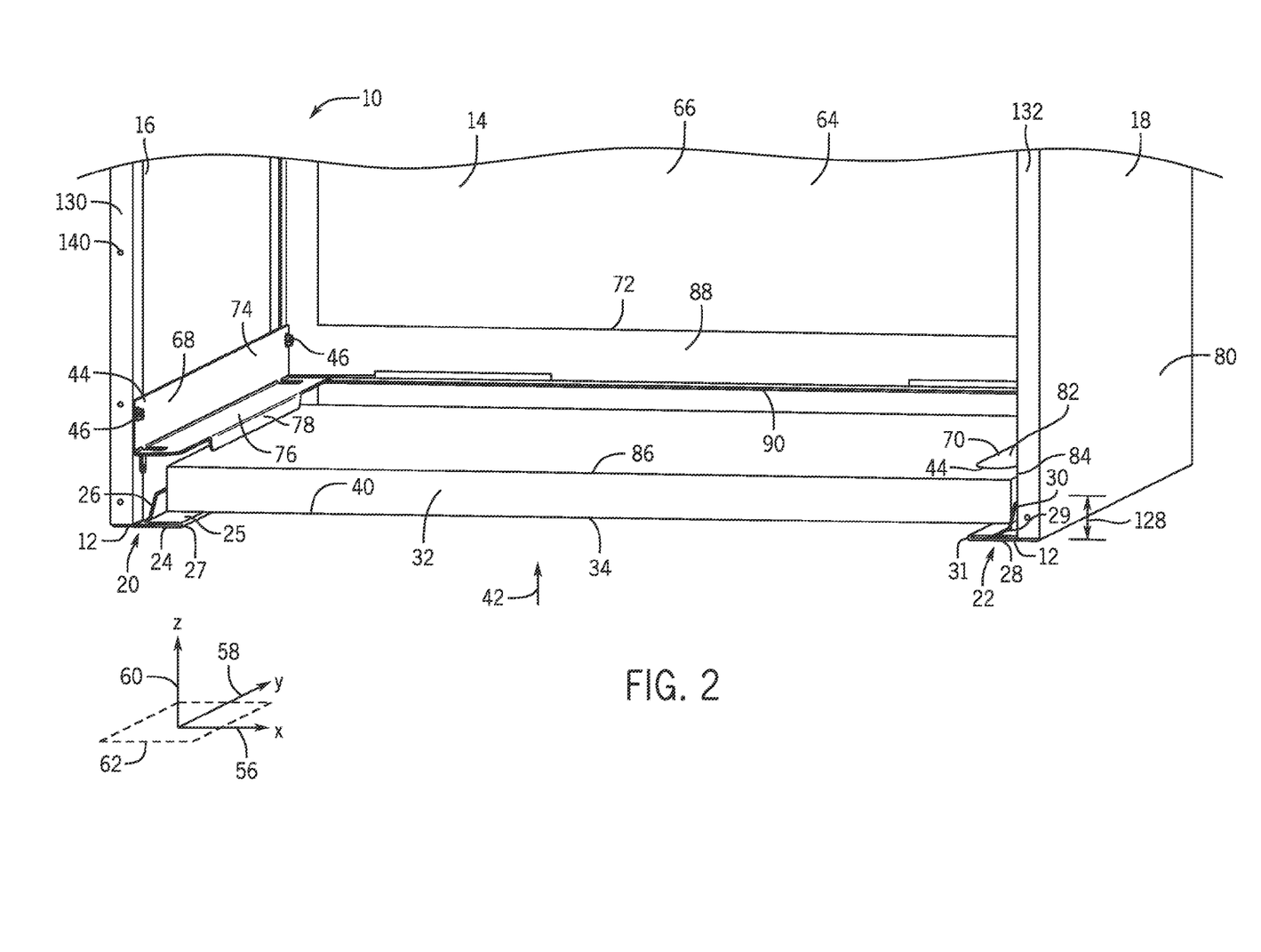
FIG. 2 is a perspective view of a portion of an air handling unit including a filter support in accordance with an embodiment of the present disclosure.

FIG. 2 is a perspective view of a portion of the air handling unit 10 including the filter support 12 in accordance with an embodiment of the present disclosure. Axes 56, 57, and 58 are utilized to describe directions relative to the air handling unit 10, where the x-axis 56 and the y-axis 58 lie in a horizontal plane 62, and the z-axis 60 extends in a vertical direction perpendicular to the horizontal plane 62. The air handling unit 10 includes the casing 14. The casing 14 is formed from a cohesive sheet of material 64 (e.g., a single, unified sheet of metal), as discussed in greater detail below. For example, the cohesive sheet of material 64 may be bent or folded to form two side walls (e.g., the first side wall 16 and the second side wall 18) and a rear wall 66. The rear wall 66 extends between and is substantially perpendicular with the first side wall 16 and the second side wall 18. A cabinet cover (e.g., door or panel) may be placed over the front to complete the enclosure of the air handling unit 10. For example, the cabinet cover may be hingedly coupled to the first and/or second side wall 16, 18 to provide a door.

As illustrated, the filter support 12 includes the first support portion 20 and the second support portion 22. The first support portion 20 is part of the first side wall 16 and formed by bending the edge of the first side wall 16 inwardly (e.g., along x-axis 56). Likewise, the second support portion 22 is part of the second side wall 18 and formed by bending the edge of the second side wall 18 inwardly (e.g., along x-axis 56). The first support portion 20 and the second support portion 22 are substantially perpendicular to the first side wall 16 and the second side wall 18, respectively, and configured to support or hold the filter 32.

The first support portion 20 and the second support portion 22 cover (e.g., abut) the portions 38, 39, respectively, of the bottom side 34 of the filter 32 by virtue of supporting the filter 32. The air may flow through the filter 32 via the uncovered portion 40 of the bottom side 34 of the filter 32. The covered portions 38, 39 and the uncovered portions 40 may have any suitable sizes (or the ratio of the size of one portion to another) depending on the design of the air handling unit 10. By way of example, the size of each of the covered portions 38, 39 is less than approximately 100%, such as approximately 90%, 80%, 70%, 60%, 50%, 40%, 30%, 20%, 15%, 10%, 5%, or 1% of the size of the uncovered portion 40.

To facilitate limiting the vertical movement (e.g., along the z-axis 60) of the filter 32, the air handling unit 10 includes the one or more side angles 44 attached to the interior walls of the air handling unit 10 above the filter support 12. As indicated above, the side angles 44 may also be formed from the casing 14. As illustrated, each of the one or more side angles 44 include a first side angle 68 attached to the first side wall 16, a second side angle 70 attached to the second side wall 18, and a third side angle 72 attached to the rear wall 66. Each of the side angles 44 (e.g., 68, 70, 72) may be attached to the respective wall with the one or more fasteners 46 (e.g., screws, adhesive features, welds).

The side angles 44 (e.g., 68, 70, 72) may have the same or different configurations with one another. For example, in the illustrated embodiment, the first side angle 68 has the same configuration as the second side angle 70 but different configuration from the third side angle 72. More specifically, the first side angle 68 includes a first angle base 74 and a first angle flange 76. The first angle base 74 is attached to the first side wall 16 with the one or more fasteners 46. The first angle flange 76 is substantially perpendicular to the first angle base 74 and extends inwardly from the first side wall 16. The first angle flange 76 includes a first elongated tooth portion 78 formed by bending all or a portion of the first angle flange 76 downwardly therefrom. Likewise, the second side angle 70 includes a second angle base 80 and a second angle flange 82, the latter of which may include a second elongated tooth portion 84. The tooth portions (e.g., the first tooth portion 78 of the first side angle 68 and the second tooth portion 84 of the second side angle 70) are in direct contact with, or proximate to, a top side 86 of the filter 32 when the filter 32 is installed. As such, the filter 32 may be positioned below the first side angle 68 and the second side angle 70, and above the first support portion 20 and the second support portion 22, thereby being limited in vertical movements (along the z-axis 60). In some embodiments, the first and second angle flanges 76, 82 do not include any tooth portions, and accordingly, the first and second angle flanges 76, 82 may be in direct contact with, or proximate to, the top side 86 of the filter 32 to limit the vertical movements (along the z-axis 60) of the filter 32.

In the illustrated embodiment, the third side angle 72 includes a third angle base 88 and a third angle flange 90, the latter of which does not include any tooth portion. In certain embodiments, the third angle flange 90 may include an elongated tooth portion similar to the first tooth portion 78. The third angle base 88 is attached to the rear wall 66, and the third angle flange 90 is substantially perpendicular to the third angle base 88 and extends inwardly from the rear wall 66.

The one or more side angles 44 (e.g., the first, second, and third side angles 68, 70, 72) are also configured to provide support for other components of the air handling unit 10. For example, the first, second, and third angle flanges 76, 82, 90 are substantially co-planar (e.g., on the horizontal plane 62) such that they may hold a supporting structure (e.g., plate, drawer, or panel) thereabove for supporting other components of the air handling unit 10, or hold or support directly thereabove other components of the air handling unit 10. In certain embodiments where the air handling unit 10 includes only two side angles (e.g., the first and the second side angles 68, 70), the first and second angle flanges 76, 82 may be substantially co-planar (e.g., on the horizontal plane 62) for supporting other components of the air handling unit 10 as well as for limiting the vertical movements of the filter 32 (e.g., with the tooth portions 78, 84). In the illustrated embodiment, the angle bases 74, 80, 88 extend above the angle flanges 76, 82, 90. In other embodiments, the angle bases 74, 80, 88 extend beneath the angle flanges 76, 82, 90.

Figure 3:
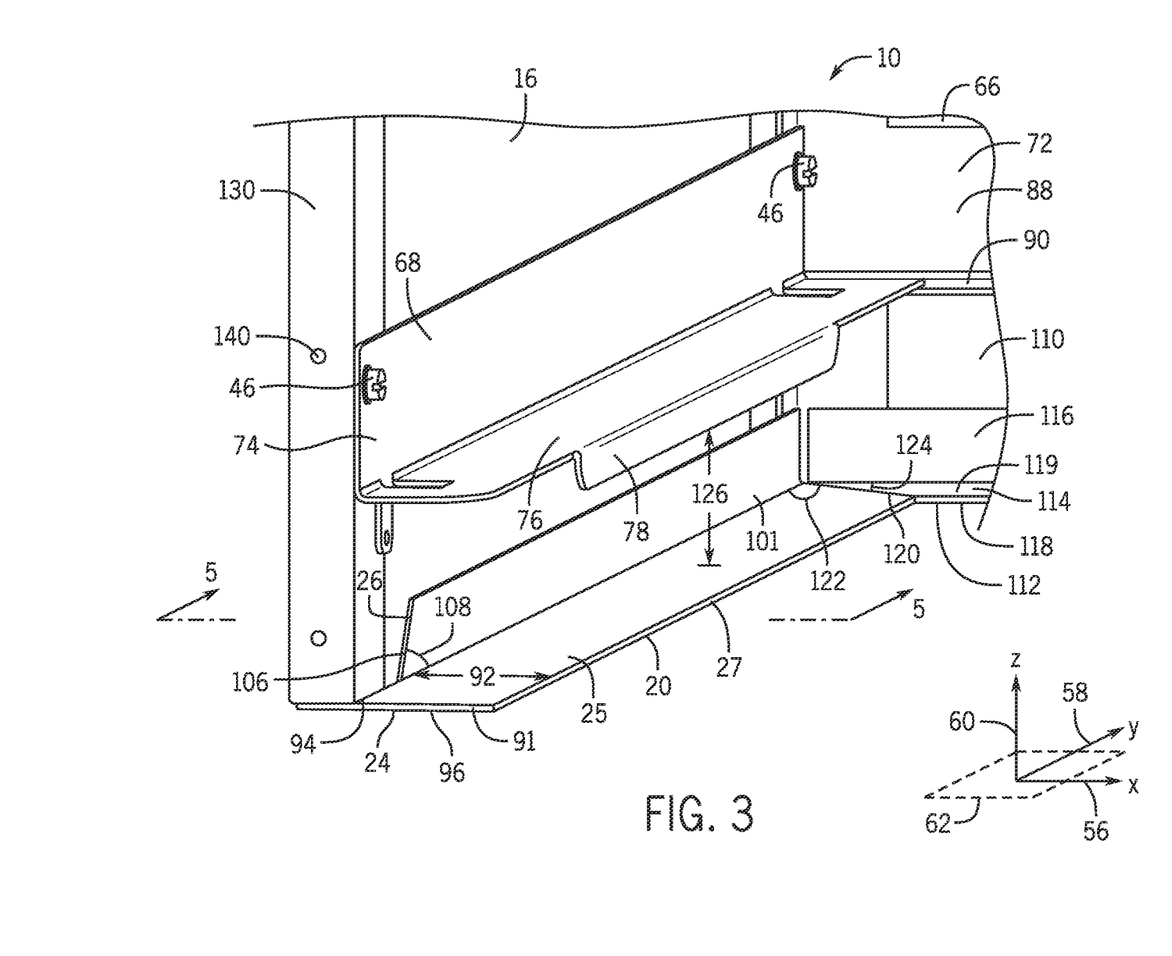
FIG. 3 is a magnified perspective view of the portion of the air handling unit including the filter support of FIG. 2.
Figure 4:
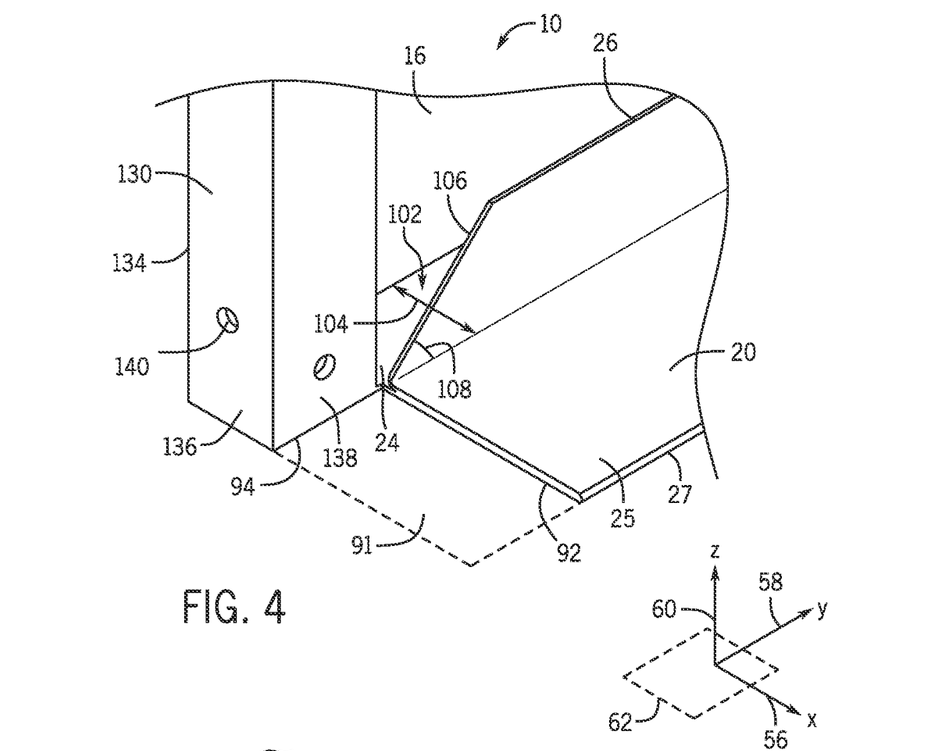
FIG. 4 is a further magnified perspective view of the portion of the air handling unit including the filter support of FIG. 2.

FIGS. 3 and 4 are magnified views of the portion of the air handling unit 10 of FIG. 2. FIG. 3 focuses on the first support portion 20 of the filter support 12 and the first side angle 68. FIG. 4 is a further magnified view of the first support portion 20 of the filter support 12 of FIG. 3. In addition, in FIG. 4, a corner piece 91 of the first support portion 20, along lines 92, 94 indicated in FIG. 3, is removed from the rest of the first support portion 20 for illustrative purposes. The line 92 is along the x-axis 56 and substantially parallel to a front edge 96 of the first support portion 20. The line 94 is along the y-axis 58 and substantially parallel to the first side wall 16.

As illustrated in FIGS. 3 and 4, the first support portion 20 includes multiple folds of the edge of the first side wall 16. A first fold forms the first base portion 24 by folding the bottom edge of the first side wall 16 inwardly therefrom. The first base portion 24 is substantially perpendicular to the first side wall 16. For example, the first side wall is on a plane defined by the y-axis 58 and the z-axis 60, and the first base portion 24 is substantially on the plane 62. The first base portion 24 extends from the first side wall along the positive x-axis 56.

A second fold continues from the first fold to form the first upper ledge 25 by extending outwardly toward the first side wall 16 from the innermost edge 27 of the first fold. For example, the first upper ledge 25 extends from the innermost edge 27 of the first base portion 24 along the negative x-axis 56. The first upper ledge 25 may provide support for the filter 32 when the filter 32 is placed above the first upper ledge 25. In the illustrated embodiment, the first upper ledge 25 is on top of (e.g., in direct contact with) the first base portion 24. In some embodiments, the first upper ledge 25 may be above and without contacting the first base portion 24, for example, there is a gap between the first upper ledge 25 and the first base portion 24.

A third fold continues from the second fold to form the first flange 26 by extending upwardly from the second fold. For example, the first flange 26 extends from the first upper ledge 25 along the positive z-axis 60, with a crease 101 joining the first flange 26 and the first upper ledge 25. As such, the first flange 26 is substantially perpendicular to the first upper ledge 25 and parallel to the first side wall 16. The first flange 26 may provide a left barrier or block to limit the horizontal movements (e.g., along the negative x-axis 56) of the filter 32 when the filter is placed above the first upper ledge 25. A gap 102 is formed between the first flange 26 and the first side wall 16 with a length 104 along the x-axis 56. The gap 102 may be filled with one or more thermal insulation materials to reduce heat exchange between the air inside of the air handling unit 10 and the environment. In some embodiments, the first flange 26 may include a slanted edge 106. For example, an angle 108 between the slanted edge 106 and the crease 101 may be less than approximately 90 degrees, such as approximately 80 degrees, 75 degrees, 60 degrees, 50 degrees, 45 degrees, 40 degrees, 30 degrees, 25 degrees, 15 degrees, or 5 degrees. The slanted edge 106 may provide ready access to the filter 32 when changing or replacing the filter 32.

Although the first support portion 20 of the filter support 12 is described herein in detail, it should be noted that the second support portion 22 of the filter support 12 may be formed and described similarly. For example, the second support portion 22 is formed by extending the bottom edge of the second side wall 18. The second support portion 22 likewise includes multiple consecutive folds, for example, a first fold to form the second base portion 28, a second fold to form the second upper ledge 29, and a third fold to form the second flange 30. The second base portion 28 extends inwardly (e.g., along negative x-axis 56) from the second side wall 18, the second upper ledge 29 extends outwardly (e.g., along positive x-axis 56) from the innermost edge 31 of the second base portion 28, and the second flange 30 extends upwardly (e.g., along positive z-axis 60) from the second upper ledge 29. The second upper ledge 29 may provide support for the filter 32 when the filter is placed above the second upper ledge 29, and the second flange 30 may provide a right barrier or block to limit the horizontal movements (e.g., along the positive x-axis 56) of the filter 32. The first upper ledge 25 and the second upper ledge 29 (or the first base portion 24 and the second base portion 28) may be substantially co-planar (e.g., on the horizontal plane 62) such that the filter 32 may be placed above the first upper ledge 25 and the second upper ledge 29 in a substantially horizontal manner (e.g., on the horizontal plane 62).

As illustrated in FIG. 3, the filter support 12 also includes a third support portion 110. Similar to the first and second support portions 20, 22, the third support portion 110 is formed by folding or bending the bottom edge of the rear wall 66. The third support portion 110 likewise includes multiple consecutive folds, for example, a first fold to form the third base portion 112, a second fold to form the third upper ledge 114, and a third fold to form the third flange 116. The third base portion 112 extends inwardly (e.g., along negative y-axis 58) from the rear wall 66, the third upper ledge 114 extends outwardly (e.g., along positive y-axis 58) from an innermost edge 118 of the third base portion 112, and the third flange 116 extends upwardly (e.g., along positive z-axis 60) from the third upper ledge 114 with a crease 119 therebetween. The third upper ledge 114 may provide support for the filter 32 when the filter is placed above the third upper ledge 114, and the third flange 116 may provide a rear barrier or block to limit the horizontal movements (e.g., along the positive y-axis 58) of the filter 32. A gap may be formed between the third flange 116 and the rear wall 66 (e.g., along the y-axis 58) and filled with one or more thermal insulation materials to reduce heat exchange between the air inside of the air handling unit 10 and the environment.

In the illustrated embodiment of FIG. 3, the first upper ledge 25 and the third upper ledge 114 are substantially co-planar (e.g., on the horizontal plane 62). The first upper ledge 25 and the third upper ledge 114, as well as the first base portion 24 and the third base portion 112, join together substantially seamlessly about a line 120. The line 120 forms a first angle 122 with the crease 101 and a second angle 124 with the crease 119. Because the first side wall 16 is substantially perpendicular to the rear wall 66, the sum of the first angle 122 and the second angle 124 is substantially 90 degrees. For example, the first angle 122 is less than approximately 90 degrees, such as approximately 80 degrees, 70 degrees, 60 degrees, 50 degrees, 45 degrees, 40 degrees, 30 degrees, 20 degrees, or 10 degrees. Correspondingly, the second angle 124 is less than approximately 90 degrees, such as approximately 10 degrees, 20 degrees, 30 degrees, 40 degrees, 45 degrees, 50 degrees, 60 degrees, 70 degrees, or 80 degrees. Similarly, the third upper ledge 114 and the second upper ledge 29 of the second support portion 22 are substantially co-planar (e.g., on the horizontal plane 62) and join together substantially seamlessly with the same or similar configurations (e.g., joining angles similar to the first and second angles 122, 124). The substantially co-planar (e.g., on the horizontal plane 62) first, second, and third upper ledges 25, 29, 114 may provide support for the filter 32 in a substantially horizontal manner. In some embodiments, the filter support 12 may not include the third support portion 110, or the third upper ledge 114 may not be substantially co-planar with the first and second upper ledges 25, 29. In these embodiments, the first upper ledge 25 and the second upper ledge 29 may be substantially co-planar (e.g., on the horizontal plane 62) such that the filter 32 may be placed above the first upper ledge 25 and the second upper ledge 29 in a substantially horizontal manner (e.g., on the horizontal plane 62) and below the third support portion 110. Also, the third support portion 110 may be excluded.

As discussed above, the vertical movements (e.g., along the z-axis 60) of the filter 32 may be limited by one or more side angles 44 (e.g. the first, second, and third side angles 68, 70, 72) disposed above the filter support 12. FIG. 3 illustrates the first side angle 68 with a closer view. As illustrated, the first angle flange 76 includes one elongated first tooth portion 78 formed by bending a portion of the first angle flange 76 downwardly (e.g., along the negative z-axis 60) therefrom. It should be noted that the first angle flange 76 may include any number of the first tooth portion 78, such as 0, 1, 2, 3, 4, 5, 6, 7, 8, 9, 10, or the like. A distance 126 along the z-axis 60 between the bottom tip of the first tooth portion 78 and the first upper ledge 25 may be configured to accommodate a height 128 (along the z-axis 60, shown in FIG. 2) of the filter 32. The distance 126 is approximately the same or greater than the height 128 of the filter 32 such that the filter 32 may fit in between the first tooth portion 78 and the first upper ledge 25, and the vertical movements (e.g., along the z-axis 60) of the filter 32 may also be limited to a desired degree. The second and third side angles 70, 72 may include the similar tooth portions. In certain embodiments where the side angles 44 do not include any tooth portion, the angle flanges (e.g., the first, second, or third angle flanges 76, 82, 90) may be in direct contact with, or proximate to, the top side 86 of the filter 32 to limit the vertical movements (along the z-axis 60) of the filter 32.

Also as illustrated in FIGS. 2-4, the casing 14 of the air handling unit 10 may be folded or bent to form one or more front posts. For example, the front edge of the first side wall 16 may be folded or bent via one or more folds to form a first front post 130. The front edge of the second side wall 18 may be folded or bent via one or more folds to form a second front post 132. Depending on the number of folds, each of the first and second front posts 130, 132 may include two or more sides. For example, as illustrated in FIG. 4, the first front post 130 includes three sides. A first side 134 is the first side wall 16. A second side 136 extends from and is substantially perpendicular to the first side 134. A third side 138 extends from and is substantially perpendicular to the second side 136. Each of the one or more front posts (e.g., the first and second front posts 130, 132) may include one or more holes 140 for coupling other components of the air handling unit 10 to the respective front posts. For example, a front panel or door may be coupled to (e.g., screwed onto, or hinged to) the casing 14 via the one or more holes 140 of the one or more front posts.

Figure 5:
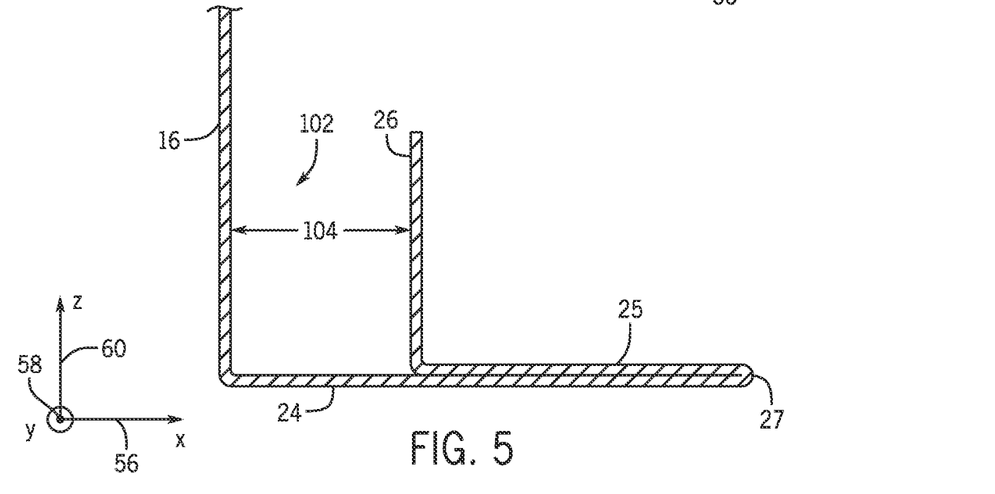
FIG. 5 is a cross-sectional view of the filter support of FIG. 4.

FIG. 5 is a cross-sectional view of the first support portion 20 of the filter support 12 taken from line 5-5 of FIG. 3. As illustrated, the first support portion 20 is an integrated part of the first side wall 16 and formed by folding the bottom edge of the first side wall 16 via multiple folds. The first fold forms the first base portion 24 by folding the bottom edge of the first side wall 16 inwardly along the positive x-axis 56. The first base portion 24 is substantially perpendicular to the first side wall 16. The second fold continues from the first fold to form the first upper ledge 25 by extending outwardly (e.g., along the negative x-axis 56) toward the first side wall 16 from the innermost edge 27 of the first fold. The first upper ledge 25 is on top of (e.g., in direct contact with) the first base portion 24. The third fold continues from the second fold to form the first flange 26 by extending upwardly (e.g., along the positive z-axis 60) from the second fold. The first flange 26 is substantially perpendicular to the first upper ledge 25 and parallel to the first side wall 16. The gap 102 is formed between the first flange 26 and the first side wall 16 with the length 104 along the x-axis 56.

Figure 6:
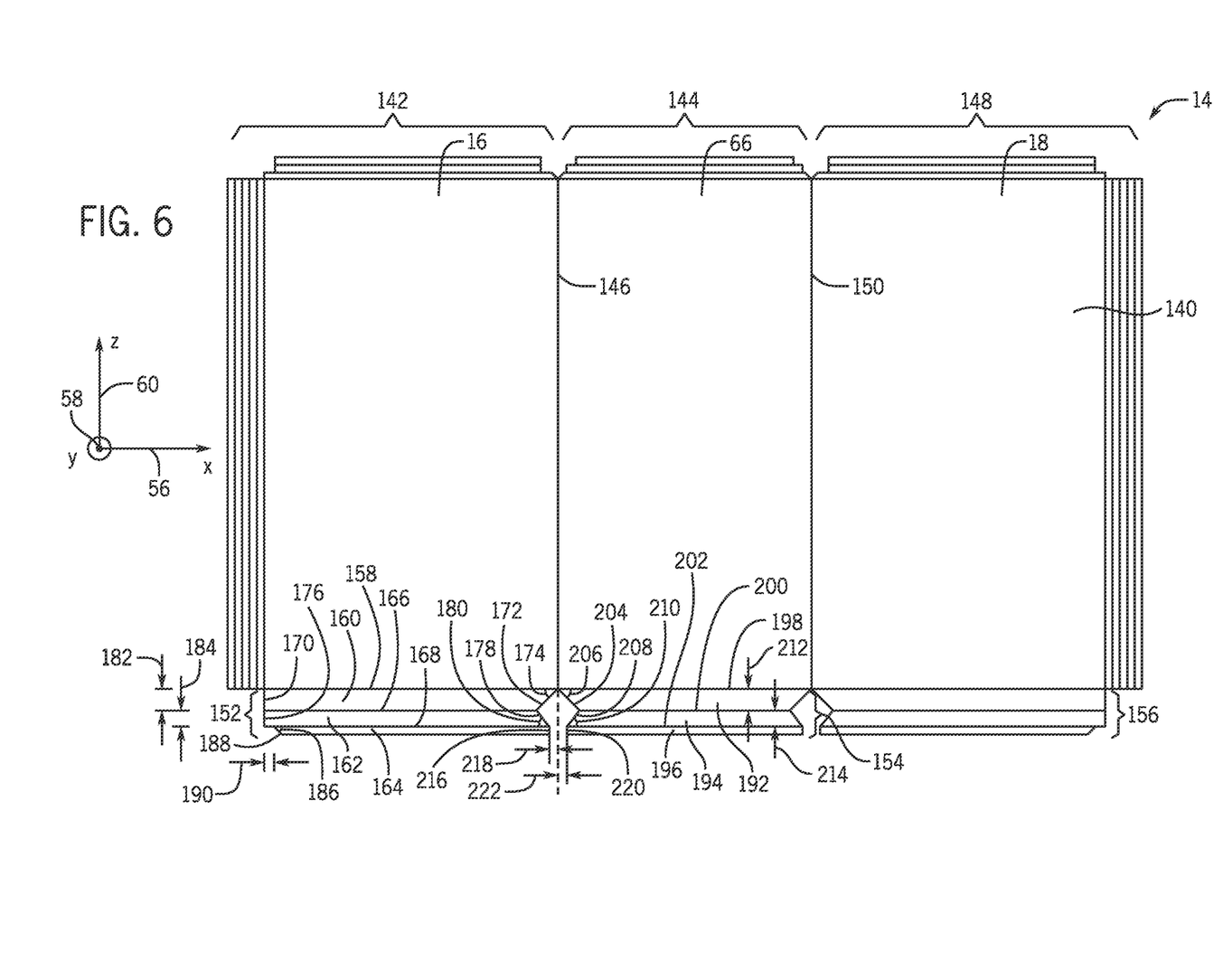
FIG. 6 is a top view of an extended or unfolded air handling unit casing in accordance with an embodiment of the present disclosure.
Figure 7:
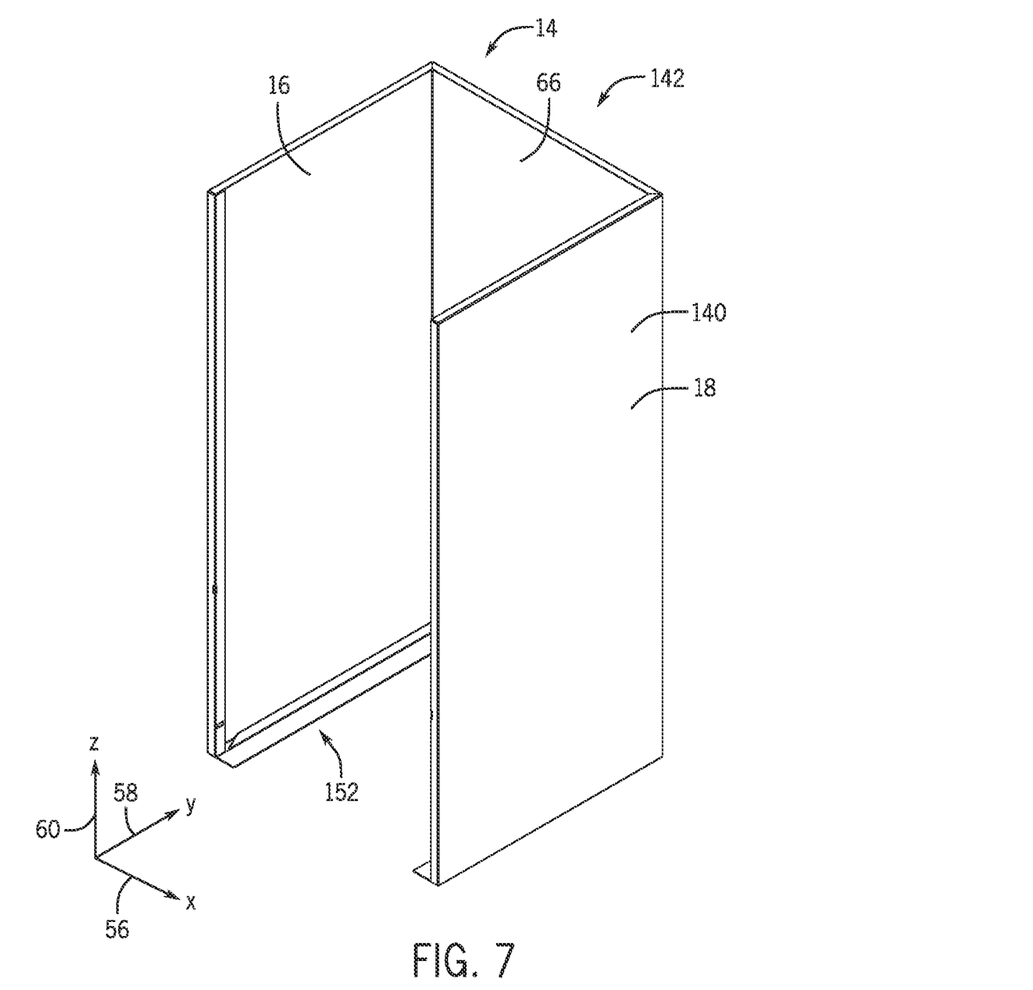
FIG. 7 is a perspective view of a folded air handling unit casing in accordance with an embodiment of the present disclosure.

As discussed above, the filter support 12, in accordance with the present disclosure, is an integrated part of the casing 14 and may be formed by bending or folding the edges of the casing 14. Therefore, the filter support 12 may be manufactured as an integrated part of manufacturing the casing 14 for the air handling unit 10. FIG. 6 is a top view of the casing 14 in an extended configuration (e.g., on the plane defined by the x-axis 56 and the z-axis 60) formed from a unified or cohesive sheet 140. FIG. 7 is a perspective view of the casing 14 that is folded from the extended configuration in FIG. 6 to form an enclosure 142 of the air handling unit 10. The cohesive sheet 140 may be fabricated from any material suitable for enclosing the air handling unit 10 and bending to form the casing 14, including, but not limited to, metal, polymer, carbon fiber, or the like. The cohesive sheet 140 may be cut or otherwise fabricated to have a profile or boundary such as the profile of the casing 14 illustrated in FIG. 6. Slits may be cut along creases to facilitate bending.

The cohesive sheet 140 may be folded or bent to form different sections of the casing 14 and the filter support 12. The cohesive sheet 140 includes multiple creases, about which various sections of the cohesive sheet 140 may be folded or bent with respect to one another. For example, a first section 142 of the cohesive sheet 140 borders a second section 144 about a crease 146, and the second section 144 borders a third section 148 about a crease 150. The first section 140 may be bent towards the second section 144 (e.g., towards the negative y-axis 58) to be substantially perpendicular to the second section 144. The third section 148 may also be bent towards the second section 144 (e.g., towards the negative y-axis 58) to be substantially perpendicular to the second section 144. As such, the first section 142 of the cohesive sheet 140 may form the first side wall 16 of the casing 14, the third section 148 of the cohesive sheet 140 may form the second side wall 16 of the casing 14, and the second section 144 the of the cohesive sheet 140 may form the rear wall 66 of the casing 14, as illustrated in FIG. 7.

The first section 142 of the cohesive sheet 140 about the bottom edge includes a first bottom edge section 152. Similarly, the second section 144 of the cohesive sheet 140 about the bottom edge includes a second bottom edge section 154, and the third section 148 of the cohesive sheet 140 about the bottom edge includes a third bottom edge section 156. The first bottom edge section 152 may be folded to form the first support portion 20 of the filter support 12, the third bottom edge section 156 may be folded to form the second support portion 22 of the filter support 12, and the second bottom edge section 154 may be folded to form the third support portion 110 of the filter support 12.

Using the first bottom edge section 152 as an example, a method is described herein to illustrate the formation of the first support portion 20 of the filter support 12 from the first section 142 of the cohesive sheet 140. The first bottom edge section 152 borders the rest of the first section 142 about a crease 158. The first bottom edge section 152 includes three folds: a first edge fold 160, a second edge fold 162, and a third edge fold 164. The first edge fold 160 borders the second edge fold 162 about a crease 166, and the second edge fold 162 borders the third edge fold 164 about a crease 168. As such, the first bottom edge section 152 may be folded in a boustrophedonic orientation (e.g., about the creases 158, 166, 168). For example, as discussed above (e.g., with respect to FIG. 5), the first edge fold 160 may be folded about the crease 158 inwardly from and substantially perpendicular to the first side wall 16 to form the first base portion 24 of the first support portion 20. The second edge fold 162 may be folded about the crease 166 outwardly towards the first side wall 16 and on top of the first edge fold 160 to form the first upper ledge 25 of the first support portion 20. The third edge fold 164 may be folded about the crease 168 upwardly and substantially parallel to the first side wall 16 to form the first flange 26 of the first support portion 20. Similar to the first bottom edge section 152, the second bottom edge section 154 and the third bottom edge section 156 may each have three folds that may be folded in a boustrophedonic orientation to form the third support portion 110 and the second support portion 22, respectively, of the filter support 12.

As illustrated, the first edge fold 160 includes a left side 170, substantially perpendicular to the crease 158, and a right side 172, forming an angle 174 (e.g., the angle 122 as illustrated in FIG. 3) with the crease 158 less than approximately 90 degrees. The second edge fold 162 includes a left side 176, substantially perpendicular to the creases 166, 168, and a right side 178, forming an angle 180 with the crease 168. The angle 180 is substantially the same as the angle 174 such that when the first and second edge folds 160, 162 are folded as discussed above, the right side 172 of the first edge fold 160 and the right side 178 of the second edge fold 162 are substantially aligned. In addition, the left side 170 of the first edge fold 160 has a length 182 that is greater than a length 184 of the left side 176 of the second edge fold 162. As such, when the first, second, and third edge folds 160, 162, 164 are folded as discussed above, there is a gap (e.g., the gap 102) between the first flange 26 and the first side wall 16. The length 104 of the gap 102 is then approximately the difference between the length 182 of the left side 170 of the first edge fold 160 and the length 184 of the left side 176 of the second edge fold 162. Further, the third edge fold 164 has a slanted left side 188 with respect to the crease 168, forming an angle 186 (e.g., the angle 108 as illustrated in FIGS. 3 and 4) therebetween. The slanted left side 188 is retracted from the left side 176 of the second edge fold 162 with a length 190 (e.g., the length (along the y-axis 58) of the corner piece 91 as illustrated in FIGS. 3 and 4).

As discussed with respect to FIG. 3, the first upper ledge 25 and the third upper ledge 114 are substantially co-planar (e.g., on the horizontal plane 62), and the first upper ledge 25 and the third upper ledge 114, as well as the first base portion 24 and the third base portion 112, join together substantially seamlessly about the line 120. As such, the left side of the second bottom edge section 154 is designed to be substantially complimentary to the right side of the first bottom edge section 152. For example, the second bottom edge section 154 includes three folds: a fourth edge fold 192, a fifth edge fold 194, and a sixth edge fold 196. The fourth edge fold 192 borders the rest of the second section 144 about a crease 198, the fifth edge fold 194 borders the fourth edge fold 192 about a crease 200, and the sixth edge fold 196 borders the fifth edge fold 194 about a crease 202. An angle 206 (e.g., the angle 124 as illustrated in FIG. 3) is formed between a left side 204 of the fourth edge fold 192 and the crease 198. The angle 206 is configured to be substantially complimentary to the angle 174. That is, the sum of the angle 206 and 174 is substantially 90 degrees. An angle 210 formed between a left side 208 of the fifth edge fold 194 and the crease 202 is substantially the same as the angle 206 such that when the fourth and fifth edge folds 192, 194 are folded as discussed above, the left side 204 of the fourth edge fold 192 and the left side 208 of the fifth edge fold 194 are substantially aligned.

The fourth edge fold 192 has a length 212 along the z-axis 60 between the creases 198 and 200, and the fifth edge fold 194 has a length 214 along the z-axis 60 between the creases 200 and 202. The length 212 is greater than the length 214, similar to the length 182 with respect to the length 184, such that when the fourth, fifth, and sixth edge folds 192, 194, 196 are folded as discussed above, a gap may be formed between the third flange 116 and the rear wall 66. This gap has a length (e.g., along the y-axis 58 illustrated in FIG. 3) that is substantially the same as a length 218 between a right side 216 of the third edge fold 164 and the crease 146. Also, the length 104 of the gap 102 between the first flange 26 and the first side wall 16 is substantially the same as a length 222 between a left side 220 of the sixth edge fold 196 and the crease 146. As such, when the first, second, and third edge folds 160, 162, 164 as well as the fourth, fifth, and sixth edge folds 192, 194, 196 are folded as discussed above, the right side 216 of the third edge fold 164 and the left side 220 of the sixth edge fold 196 join one another substantially seamlessly. In some embodiments, the length 218 may be greater than the length of the gap between the third flange 116 and the rear wall 66 and/or the length 222 may be greater than the length 104 of the gap 102 between the first flange 26 and the first side wall 16. As such when the first, second, and third edge folds 160, 162, 164 as well as the fourth, fifth, and sixth edge folds 192, 194, 196 are folded as discussed above, a gap may be formed between the right side 216 of the third edge fold 164 and the left side 220 of the sixth edge fold 196. The third bottom edge section 156 may be designed similarly to the first bottom edge section 152 as described above with respect to the second bottom edge section 154 such that when folded, the second support portion 22 may join the third support portion 110 similarly to the way the first support portion 20 joins the third support portion 110 as described above.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An air handling system, comprising:
    a casing structure formed from a cohesive sheet of material, wherein the casing structure comprises:
    a first side wall formed from a first section of the cohesive sheet of material;
    a first support portion extending inwardly from the first side wall, wherein the first support portion is formed from a folded portion of the first section of the cohesive sheet of material;
    a second side wall disposed substantially opposite the first side wall, wherein the second side wall is formed from a second section of the cohesive sheet of material; and
    a second support portion extending inwardly from the second side wall, wherein the second support portion is formed from a folded portion of the second section of the cohesive sheet of material and wherein the first and second support portions are configured to support a filter.

2. The air handling system of claim 1, wherein each of the first and second support portions comprises a folded edge of the cohesive sheet of material.

3. The air handling system of claim 1, wherein the first support portion comprises:
    a first fold that forms a base portion of the first support portion, the base portion extending inwardly from the first side wall;
    a second fold that forms an upper ledge of the first support portion, the upper ledge extending outwardly toward the first sidewall from an innermost edge of the first fold; and
    a third fold that forms a flange of the first support portion, the flange extending upwardly from the upper ledge.

4. The air handling system of claim 3, wherein the flange is spaced from the respective side wall.

5. The air handling system of claim 3, wherein the flange comprises a slanted edge.

6. The air handling system of claim 1, wherein the casing structure comprises a back wall extending between the first side wall and the second side wall.

7. The air handling system of claim 6, wherein the back wall comprises a third support portion extending inwardly from the back wall, wherein the first, second, and third support portions are configured to support the filter.

8. The air handling system of claim 7, wherein the first, second, and third support portions each include protrusions that are substantially co-planar.

9. The air handling system of claim 1, wherein the first and second support portions comprise respective flanges extending along the respective side walls.

10. The air handling system of claim 1, wherein the first and second support portions each comprises:
    a first fold that forms a base portion extending inwardly from the respective side wall;
    a second fold that forms an upper ledge extending outwardly toward the respective sidewall from an innermost edge of the first fold; and
    a third fold that forms a flange extending upwardly from the upper ledge.

11. The air-handing system of claim 1, comprising a door extending between an exposed edge of the first side wall and an exposed edge of the second side wall.

12. The air handling system of claim 1, comprising:
    a first side angle attached to the first side wall above the first support portion; and
    a second side angle attached to the second side wall above the second support portion;
    wherein each of the first and second side angles comprises an angle base attached to the respective side wall and an angle flange generally perpendicular to the angle base and extending inwardly from the respective side wall.

13. The air handling system of claim 12, wherein each of the respective angle flanges comprises a tooth portion extending downwardly from the respective angle flange, wherein each tooth portion of the respective angle flange and the respective support portion form a channel configured to receive the filter therebetween.

14. A method of manufacturing a casing for an air handling system, comprising:
bending a unified sheet to form a first side wall, a back wall, and a second side wall of the casing such that the back wall extends between and is substantially perpendicular with the first and second side walls;
folding a portion of the first side wall to form a first support portion extending inwardly from the first side wall; and
folding a portion of the second side wall to form a second support portion extending inwardly from the second side wall, wherein the first and second support portions are configured to support a filter.

15. The method of claim 14, comprising folding a portion of the back wall to form a third support portion extending inwardly from the back wall.

16. The method of claim 14, wherein folding the portion of the first side wall comprises bending an edge of the first side wall inward about a first crease to form a base and bending the edge of the first side wall back onto itself about a second crease to form an upper ledge that is substantially parallel with the base.

17. The method of claim 16, comprising bending the edge of the first side wall upward about a third crease to form a flange in a transverse orientation relative to the upper ledge.

18. The method of claim 17, comprising positioning the third crease such that the flange is spaced from the respective side wall.

19. An air handling system, comprising:
a casing formed from a solid sheet of material;
at least three walls of the casing formed from portions of the solid sheet of material separated by creases that are formed substantially in parallel; and
edges of the walls that are folded to form projections extending inward relative to the casing, wherein the projections are configured to cooperate to retain a filter within the casing.

20. The air handling system of claim 19, wherein the edges of the walls are folded in a boustrophedonic orientation.

* * * * *